Figure 1:
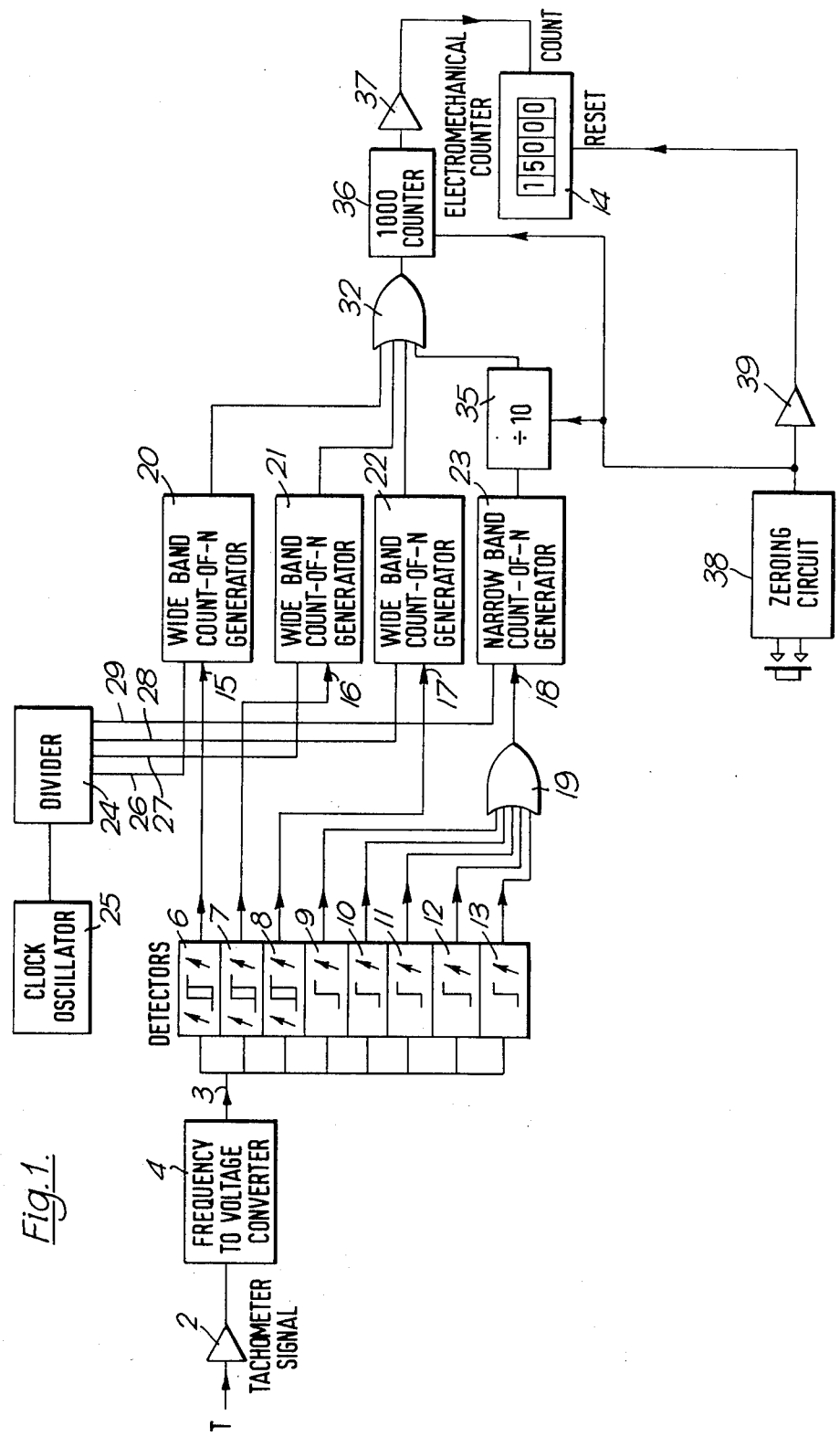

United States Patent [19]

Aldridge et al.

[11] 4,112,747

[45] Sep. 12, 1978

[54] REAL-TIME RECORDING OF FATIGUE DAMAGE

[75] Inventors: Trevor John Aldridge, Aston-on-Trent; Alan Howard Lock, Belper; Robert Martin Alistair Bell, Borrowash, all of England

[73] Assignee: Rolls-Royce Limited, London, England

[21] Appl. No.: 797,803

[22] Filed: May 17, 1977

[30] Foreign Application Priority Data

May 22, 1976 [GB] United Kingdom ............... 21303/76

[51] Int. Cl.² ........................................... G01M 15/00
[52] U.S. Cl. ............................................ 73/116; 73/91
[58] Field of Search ............ 73/116, 91, 117.2, 117.3

[56] References Cited

U.S. PATENT DOCUMENTS

| | | | |
|---|---|---|---|
| 3,035,443 | 5/1962 | Gray | 73/116 UX |
| 3,527,086 | 9/1970 | Evans et al. | 73/116 |
| 3,686,484 | 8/1972 | Ciemochowski | 73/116 X |
| 3,950,985 | 4/1976 | Buchwald et al. | 73/116 |

Primary Examiner—Jerry W. Myracle
Attorney, Agent, or Firm—Cushman, Darby & Cushman

[57] ABSTRACT

In the case of those rotating components of rotary machines which are cyclically stressed as their rotational speeds are cyclically varied such as aero gas turbine engine components, the cumulative total number of stress cycles which each component receives due to such speed variations is a reliable indication of its elapsed fatigue life. The invention provides a method and a digital circuit arrangement which facilitates real-time recording of the elapsed fatigue lives of such components: a component's rotational speed is continuously monitored and each time the speed cycles through any one of a plurality of predetermined speed bands, a corresponding predetermined number of fatigue life units is added to an accumulating total of such units.

16 Claims, 3 Drawing Figures

REAL-TIME RECORDING OF FATIGUE DAMAGE

The present invention relates to real-time recording of elapsed fatigue life of components of rotary machines which are cyclically stressed as their rotational speed is cyclically varied. In particular, but not exclusively, the invention enables fatigue damage to be recorded in respect of rotating components of gas turbine engines, during a period of time for which the use of the engine is monitored.

It is well known that one of the factors which affects the rate at which the useful life of rotating machinery is used up is the rotational speed during operation. In the case of machinery such as an aero gas turbine engine, which operates under widely differing conditions of load and rotational speed, the rotating components are stressed cyclically as the rotational speed is varied over the operating range, and the number of stress cycles which the components receive becomes a more important limitation on their fatigue life than the actual number of operating hours or the temperature of operation. For the purposes of the present invention, fatigue damage to an article is measured in terms of the number of stress cycles known to have been undergone by the article, where the fatigue life of the article has been deduced empirically from previous tests on identical articles and by fatigue analysis, and can be predicted in terms of the number of stress cycles of a predetermined nature which the article can safely withstand. Thus, both the amount of fatigue damage experienced by an article, and its fatigue life, can be measured in terms of the same units.

It is a practice within the aero engine industry to state the fatigue life of rotating components (such as rotor discs) in particular types of gas turbine engines in terms of a maximum allowed number of "zero to max." reference cycles of the component's rotational speed. A "zero to max." reference cycle is defined as one cycle from zero speed to maximum normal rotational speed of the component being monitored and back to zero, irrespective of how long the cycle takes to complete and regardless of whether the speed of the component remains constant for a time during the cycle.

Aero gas turbine engines are usually operated at certain standard speeds during a flight, such as the speed at take-off under normal conditions, or flight cruising speed. Thus, if the type of flight regularly flown by an aircraft is known, the probable variations in engine speed experienced during the flight can be assessed and converted into an equivalent number of zero to max. reference cycles; an estimate of fatigue life usage can therefore be made.

Unfortunately, not all flights made by an aircraft will conform to the expected pattern, and therefore there will be differences between the assessed and actual variations in engine speed. Further, actual engine speeds in similar flights will vary somewhat according to who is flying the aeroplane. These two factors lead to inaccuracy in the estimated fatigue life usage.

There is therefore a need for some means whereby actual engine speed variations are automatically converted with reasonable accuracy into units indicative of fatigue damage suffered by engine components.

The present invention provides a method for real-time recording of the elapsed fatigue life of a component of a rotary machine which is cyclically stressed as its rotational speed is cyclically varied, in which the rotational speed of the component is continuously monitored during its operation and each time the speed cycles through any one or more of a plurality of predetermined speed bands, a corresponding number of fatigue life units is added to an accumulating total of such units, the value of said number depending upon which band or bands are concerned in accordance with known empirically or theoretically deduced data.

Preferably the fatigue life units are added on to the accumulating total each time the rotational speed passes successively through the lowest and highest speeds defining a band.

Preferably, the plurality of predetermined speed bands include one or more wide speed bands and one or more narrow speed bands, for example, three wide speed bands and five narrow speed bands. When a plurality of wide speed bands and a plurality of narrow speed bands are provided, the number of fatigue life units added to the accumulating total when the rotational speed cycles through a wise speed band should vary according to which wide speed band is passed through, but the number of fatigue life units added to the accumulating total when the rotational speed cycles through a narrow speed band may be the same whichever narrow speed band is passed through, though it is preferred that the narrow speed bands are more closely spaced at high speed than at low speeds to compensate for the greater fatigue damage experienced by components at high speeds.

The fatigue life units may be "zero to max." reference cycles as hereinbefore defined.

Also according to the present invention, apparatus suitable for real-time recording of the elapsed fatigue life of a rotary machine component which is cyclically stressed as its rotational speed is cyclically varied, includes:

means for producing a speed signal which is a function of the rotational speed of the machine component speed cycle detector means connected to receive the speed signal and responsive to emit a detector signal each time the speed signal cycles through any one of a plurality of predetermined speed bands each representing a speed cycle likely to be experienced by said component;

count means connected to said detector means and operative to generate a count signal upon receipt of each detector signal, the value of each said count signal being appropriate to the speed cycle concerned and representing a respective predetermined number of fatigue life units; and means operative to sum and record the total number of elapsed fatigue life units upon receipt of said count signals.

Figure 2:
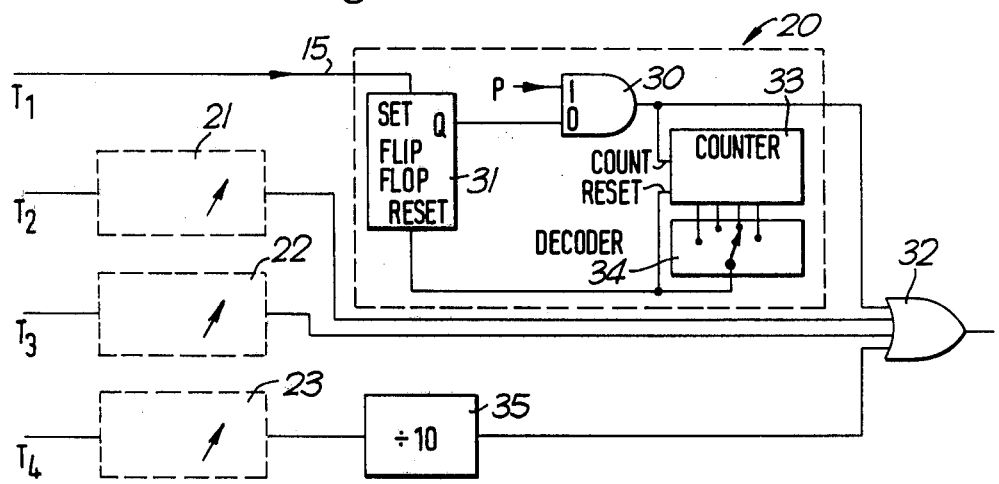
Figure 3:
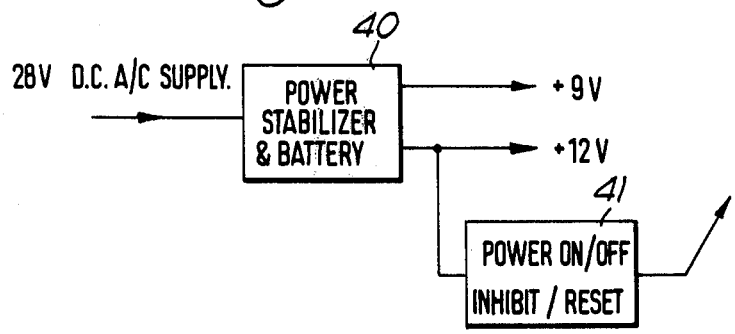

An embodiment of the invention, as applied to a particular type of aero gas turbine installation, will now be described, by way of example only, and with reference to the accompanying drawings, in which:

FIG. 1 is a block diagram of the major components and assemblies of a fatigue life monitoring device, FIG. 2 shows part of the device in more detail, and FIG. 3 shows circuitry for stabilizing the aircraft power supply so as to give suitable voltage outputs to the fatigue life monitoring device.

The device shown in FIG. 1 can record fatigue life usage of a chosen engine component. Explained briefly, a voltage 3, whose magnitude is dependent on engine speed, is fed to a number of voltage-level detector circuits 6 to 13, each of which corresponds to a predetermined range of speed, termed a "band." As engine speed rises through each band, the corresponding detector is caused to give an output pulse which is fed to an appropriate one of the counting circuits 20 to 23, which then emits a predetermined number of pulses appropriate to the speed band. The pulses from each counting circuit are summed and the electromechanical counter 14 records the number of fatigue life units used up for the chosen component.

The device has been designed on the basis that the total stress in the rotating components of the engine varies as a function of their rotational speed and that the fatigue life usage due to variations in operating temperature of the components is ignored. It has been found that variations in temperature can be disregarded with only a small loss of accuracy, which in this case is acceptable.

The device records the number of "zero to max." reference cycles experienced by a chosen component, but other components rotating at the same speed which are made of different materials or which experience different stress levels in service will have different fatigue lives. The fatigue life usage for such other components can be obtained by multiplying the number of fatigue life units recorded by the device in respect of the chosen engine component by a "read-across factor" for each of the other components. Initially these read-across factors are obtained by separately calculating the fatigue lives of the other components in terms of the number of "zero to max." reference cycles that they are allowed to experience. The present device can be easily modified to automatically multiply the basic reading by the appropriate factor and to give a further readout for each of the other components.

The Table below sets out the basic data concerning the speed bands to which detectors 6 to 13 respond. Three wide bands 1 to 3 are provided whose upper and lower speeds are such that corresponding detectors 6 to 8 detect changes in engine speed which approximate to the three major expected cyclic variations, or "cycles," of engine speed. In order to detect minor engine cycles whose occurrence cannot be foreseen, five narrow bands 4 to 8 are also provided whose respective mean values correspond to the highest speeds of five notional minor engine cycles arranged between 60 and 100% of normal maximum speed (it is considered that minor engine cycles below the former speed are not of sufficient significance to warrant consideration).

The highest speeds of the minor cycles are defined by narrow bands rather than a single speed level, because if engine speed were to dwell at that level, minute fluctuations in speed would cause the device to register excessive counts of fatigue life units as the level was crossed and recrossed.

TABLE

| DETECTOR | SPEEDS IN % OF MAX. R.P.M. | | | | | | | |
|---|---|---|---|---|---|---|---|---|
| | 6 | 7 | 8 | 9 | 10 | 11 | 12 | 13 |
| BAND | 1 | 2 | 3 | 4 | 5 | 6 | 7 | 8 |
| UPPER SPEED | 92 | 97 | 98 | 65 | 86 | 94 | 98 | 101 |
| LOWER SPEED | 6 | 69 | 92 | 63 | 84 | 92 | 96 | 99 |
| FATIGUE LIFE UNITS (ZERO TO MAX. REFERENCE CYCLES) | 0.73 | 0.255 | 0.005 | 0.002 | 0.002 | 0.002 | 0.002 | 0.002 |

Also shown is the number of fatigue life units (i.e. zero to max. reference cycles) counted by the device as each detector 6 to 13 is activated. When a major engine cycle occurs, one or more of the wide bands plus some or all of the narrow bands will be passed through, and therefore it is arranged that the number of fatigue life units counted by the device as the bands are passed through adds up to the correct value for the engine cycle being experienced. For example, if the engine experiences one cycle of magnitude zero r.p.m. to 100% of normal maximum r.p.m., i.e. a nominal zero to max. cycle, the number of fatigue life units counted will be:

| Band 1 | 0.73 |
| Band 2 | 0.255 |
| Band 3 | 0.005 |
| Bands 4 to 8 | 0.01 |
| Total: | 1.000 zero to max. reference cycles |

However, if the engine were to experience a cycle of magnitude 86 to 100% of normal maximum r.p.m. during the course of a flight, the total number of fatigue life units counted for that cycle would be those due to Band 3 plus Bands 6 and 7, i.e. 0.005 + 0.004 = 0.009 zero to max. reference cycles.

It will be noted that to keep the device as simple as possible, Bands 4 to 8 are each allotted an equal number of fatigue life units, but in order to allow for the fact that minor engine cycles near maximum speed are much more damaging than those at lower speeds, Bands 4 to 8 are more closely spaced at high speeds than at lower speeds. However, to have equally spaced narrow speed bands with different numbers of fatigue life units would be an obvious option for the designer.

Referring now to FIG. 1, a signal T is received from a tachometer (not shown). The signal T has a frequency related to the rotational speed in that shaft which carries the component chosen for fatigue life monitoring. The signal T is amplified by a buffer amplifier 2 and converted in converter 4 to a voltage signal 3 which is proportional to the speed. Signal 3 is then fed simultaneously to eight detectors 6 to 8 and 9 to 13. Each of the detectors comprises a trigger circuit and a pulse-shaper. Each trigger circuit has lower and upper trigger points which correspond to the lower and upper values of a speed band as set out in the Table. When the value of voltage 3 rises through the bottom and top trigger points of a trigger circuit successively, the output of the trigger circuit changes state and causes the associated pulse-shaper to emit a sharp pulse. In the case of the three wide-band detectors 6 to 8 these output pulses are respectively designated 15, 16, 17. Because all the narrow speed bands are assigned the same number of fatigue life units, the output pulses of all the narrow band detectors 9 to 13 are fed to an OR gate 19 to produce signal 18 for subsequent common processing as described below.

Each wide speed band detector output pulse 15, 16, 17 is fed to a respective circuit 20, 21, 22 designed to generate a respective predetermined number of pulses according to the number of fatigue life units assigned to that speed band. The signal 18 from OR gate 19 is fed to a similar circuit 23. Circuits 20 to 23 are "count-of-N" generators in which the number of pulses generated is pre-settable.

In order to provide a common counting reference for each count-of-N generator, a divider 24 receives oscillations from a clock oscillator 25. Divider 24 sends successive pulses along lines 26 to 29 respectively so that the pulses fed respectively to the generators 20 to 23 are spaced in time. This ensures that simultaneous or near-simultaneous operation of more than one of the generators does not occur.

In the case of the wide speed band count-of-N generators 20 to 22 one clock pulse represents 0.001 fatigue life units, and in the case of the narrow speed band count-of-N generator 23, a different scale is used such that one pulse 19 is equivalent to 0.0001 fatigue life units. This allows greater resolution in pre-setting the number of fatigue life units allotted by generator 23 to the narrow bands, which is needed because of the greater number of narrow band crossings expected in each flight.

The operation of the generators 20 to 23 will now be described with particular reference to circuit 20 which is typical of the others, and which is shown in more detail in FIG. 2 within the broken lines.

Count-of-N generator 20 has an AND gate 30 which receives and gates clock pulses P from clock 25 and divider 24. The gate 30 is normally held in the "O" state while a RESET-SET flip-flop 31 is in the RESET state. When a pulse 15 is received from the detector 6 flip-flop 31 is SET thus enabling AND gate 30. Pulses P are then passed to an OR gate 32 and to a counter 33, which is preset by means of a multi-way "decoder" switch arrangement 34 to count a desired number of pulses. When the counter 33 has counted the preset number of pulses, an output from the decoder 34 resets flip-flop 31 and disables AND gate 30 thus preventing further clock pulses P passing. The gated clock pulses P are passed direct to OR gate 32, as are the outputs from the other similar circuits 21 and 22, and the number of clock pulses passed is the fatigue damage value allotted by the device to speed Band 1, i.e. 730 pulses are passed by generator 20.

The narrow speed band count-of-N generator 23 also passes gated clock pulses P, but because the clock pulses which it passes represent elapsed fatigue life values which are an order of magnitude lower than that of the other circuits 20 to 22, it includes a "divide by 10" counter 35.

The total number of pulses coming out from OR gate 32 is thus in units of 0.001 fatigue life units. These are then passed through a 1000-counter 36 which has the effect of dividing the number of pulses by one thousand. Thus, each pulse emitted from counter 36 represents one fatigue life unit, and after passing through a buffer amplifier 37 the pulses are recorded in the electromechanical counter 14 for display, e.g. in the cockpit of the aeroplane. Counters 35 and 36, together with electromechanical counter 14, can be reset to zero by virtue of their respective connections to a common push-button zeroing circuit 38. Amplifier 39 buffers the reset signal to the electromechanical counter 14.

When a flight ends there will almost certainly be partial counts in counters 35 and 36. A separate power supply is provided to these devices so that these partial counts are not lost and in order that the device can accumulate counts of fatigue life units accurately over more than one flight cycle. The separate power supply is independent of the aeroplane power systems and includes a battery which is trickle-charged when the main aircraft power is on.

Random logic signals occur as the logic power supply is turned on or off, and therefore supply monitoring electrical transient-inhibiting circuitry and reset circuitry is provided, the latter being for the purpose of resetting counter 33 in count-of-N generator 20 and the other similar counters in the other count-of-N generators 21 to 23 each time the device is switched on.

A power stabiliser is also needed to stabilise the aircraft power supply and give suitable voltage outputs for feeding to the device. However, the power stabiliser, battery and inhibit/reset elements of the apparatus are well-known in themselves and will therefore not be described in detail. Reference is made to FIG. 3, where the block diagram shows that a 28 volt direct current supply from the aircraft power systems is fed to the unit 40 which comprises the power stabiliser and the battery, the battery being permanently connected to the counters 35 and 36 via the line labelled +9 volts. The power stabiliser provides the +12 volt line and powers the rest of the device. Unit 41 comprises the POWER ON/OFF inhibit and reset circuitry.

The device described above is adjustable so that it can be used to determine the fatigue damage experienced by any one of a plurality of engine components, and also so that it can be used on more than one type of engine or aircraft. Adjustment is achieved by means of appropriate voltage level settings in detectors 6 to 13 and appropriate pre-setting of counter decoder circuits 34 within preset count-of-N generators 20 to 23.

Further, by incorporating further circuitry of the same type or omitting circuitry, either more or less speed bands, either wide or narrow, could be covered by the device as necessary. For example, if it were desired to use the device to monitor fatigue life usage of a gas turbine engine used for electricity generation, fewer narrow speed bands would be used because such engines undergo fewer small variations in speed than an aero engine.

In order to improve the accuracy of the device, should this be thought necessary, it would be possible to include an additional circuit associated with the broadband trigger circuit for the take-off cycle which would add an appropriate number of fatigue life units to the total to account for the variation in temperature during the take-off cycle.

What we claim is:

1. A method for real-time recording of elapsed fatigue life of a component of a rotary machine which is cyclically stressed as its rotational speed is cyclically varied, in which the rotational speed of the component is continuously monitored during its operation and each time the speed cycles through any one or more of a plurality of predetermined wide speed bands and any one or more of a plurality of predetermined narrow speed bands wherein each of the speed bands is defining a different operational speed cycle of said component of the rotary machine, a corresponding predetermined number of fatigue life units is added to an accumulating total of such units, the value of said number depending upon which band or bands are concerned in accordance with known empirically or theoretically deduced data.

2. A method according to claim 1 in which the fatigue life units are added on to the accumulating total each time the rotational speed passes successively through the lowest and highest speeds defining a band.

3. A method according to claim 1 in which the number of wide speed bands is three and the number of narrow speed bands is five.

4. A method according to claim 1 in which the number of fatigue life units added to the accumulating total of such units when the rotational speed cycles through a wide speed band varies according to which wide speed band is passed through.

5. A method according to claim 1 in which the number of fatigue life units added to the accumulating total of such units when the rotational speed passes through a narrow speed band is the same whichever narrow speed band is passed through, said narrow speed bands being closer to each other at high speeds than at low speeds to compensate for the greater fatigue damage experienced by components during speed cycles having a high maximum speed.

6. A method according to claim 1 in which the fatigue life units are "zero to max. reference cycles" as hereinbefore defined.

7. A method according to claim 1 in which the wide speed bands monitored define expected major speed cycles of the component of the rotary machine and the narrow speed bands monitored define mean values of the highest speeds of a corresponding number of national minor speed cycles of the component of the rotary machine.

8. A method according to claim 7 in which the national minor speed cycles are between 60 and 100% of normal maximum speed of the component of the rotary machine.

9. Apparatus suitable for real-time recording of the elapsed fatigue life of a rotary machine component which is cyclically stressed as its rotational speed is cyclically varied comprising:
means for producing a speed signal which is a function of the rotational speed of the machine component;
speed cycle detector means connected to receive the speed signal and responsive to emit a detector signal each time the speed signal cycles through any one of a plurality of predetermined speed bands, each of said speed bands defining a different operational speed cycle of said rotary machine component, said speed cycle detector means including a plurality of detector elements corresponding on a one-to-one basis with said predetermined speed bands, each detector element being responsive to emit a detector signal each time the speed signal cycles through its speed band;
count means connected to said detector means, said count means being operative to generate a count signal upon receipt of each detector signal emitted from said detector elements, the value of each said count signal being appropriate to the speed cycle concerned and representing a respective predetermined number of fatigue life units;
and means operative to sum and record the total number of elapsed fatigue life units upon receipt of said count signals.

10. Apparatus according to claim 9 in which each detector element includes means defining the lowest and highest speed signal values for the corresponding speed band and means operative to cause emission of a detector signal each time the speed signal passes successively through said lowest and highest values.

11. Apparatus suitable for real-time recording of the elapsed fatigue life of a rotary machine component which is cyclically stressed as its rotational speed is cyclically varied comprising:
means for producing a speed signal which is a function of the rotational speed of the machine component;
speed cycle detector means connected to receive the speed signal and responsive to emit a detector signal each time the speed signal cycles through any one of a plurality of predetermined wide speed bands each defining a different operational speed cycle of the rotary machine component and through any one of a plurality of predetermined narrow speed bands, each defining a different operational speed cycle of the rotary machine component, said speed cycle detector means including a first set of detector elements and a second set of detector elements, each of the elements of said first set corresponding to a respective broad speed band and each of the elements in the second set corresponding to a respective narrow speed band, each of the elements of said first and second sets being responsive to emit a detector signal each time the speed signal cycles through its speed band;
count means connected to said detector means, said count means being operative to generate a count signal upon receipt of each detector signal emitted from said detector elements, the value of each said count signal being appropriate to the speed cycle concerned and representing a respective predetermined number of fatigue life units;
and means operative to sum and record the total number of elapsed fatigue life units upon receipt of said count signals.

12. Apparatus according to claim 11 in which there are three detector elements in the first set and five detector elements in the second set.

13. Aparatus according to claim 11 in which each one of the first set of detector elements is connected to a respective counting element in the counting means, each said counting element upon receipt of a detector signal being operative to generate a count signal of a predetermined value appropriate to the corresponding wide speed band.

14. Apparatus according to claim 11 in which each one of the second set of detector elements is connected to a common counting element in the counting means, said counting element upon receipt of a detector signal being operative to generate a count signal of predetermined value which is the same for each narrow speed band, the means defining the lowest and highest speed signal values for the narrow speed bands being adjusted so that narrow speed bands are closer together at high speeds than at low speeds to compensate for the greater fatigue damage experienced by components during speed cycles having a high maximum speed.

15. Apparatus according to claim 11 wherein the wide speed bands monitored define expected major speed cycles of the rotary machine component and wherein the narrow speed bands monitored define mean values of the highest speeds of a corresponding number of national minor speed cycles of the rotary machine component.

16. An apparatus according to claim 15 wherein the national minor speed cycles are between 60 and 100% of normal maximum speed of the rotary machine component.

* * * * *